United States Patent [19]
Wilson

[11] 4,276,183
[45] Jun. 30, 1981

[54] COBALT MODIFIED MAGNETIC IRON OXIDE

[75] Inventor: David M. Wilson, Easton, Pa.

[73] Assignee: Pfizer Inc., New York, N.Y.

[21] Appl. No.: 54,393

[22] Filed: Jul. 2, 1979

Related U.S. Application Data

[63] Continuation-in-part of Ser. No. 954,498, Oct. 25, 1978, abandoned.

[51] Int. Cl.³ .............................................. C01G 49/02
[52] U.S. Cl. .................................. 428/480; 427/128; 428/900; 428/694; 252/62.56
[58] Field of Search ................. 252/62.56; 427/128; 428/539, 900

[56] References Cited

U.S. PATENT DOCUMENTS

| 3,725,126 | 4/1973 | Haller et al. | 252/62.56 X |
| 3,748,270 | 7/1973 | Hwang | 252/62.56 |
| 4,071,610 | 1/1978 | Koester et al. | 252/62.56 |

FOREIGN PATENT DOCUMENTS

| 2036612 | 2/1971 | Fed. Rep. of Germany | 252/62.56 |
| 2243231 | 3/1974 | Fed. Rep. of Germany | 252/62.56 |
| 2650890 | 5/1978 | Fed. Rep. of Germany | 252/62.56 |
| 51-38094 | 3/1976 | Japan . | |
| 52-24237 | 6/1977 | Japan . | |

*Primary Examiner*—Jack Cooper
*Attorney, Agent, or Firm*—Francis X. Murphy; Charles J. Knuth; James H. Monroe

[57] ABSTRACT

Magnetic material comprising magnetic iron oxide modified with at least about 0.5 weight % cobalt, based on the weight of total product which when combined with a binder at a 75% by weight loading forms a magnetic recording member having an orientation ratio and coercivity value that corresponds to a coordinate value equal to or above the coordinate values on the FIGURE and an M-factor value between about −1.0 and +1.0. The magnetic material is preferred in which the amount of cobalt present is from about 0.5 to about 5.0 weight % based on the weight of total product and in which chromium is also present in an amount of from about 0.1 to about 0.3 weight percent based on the weight of total product. A magnetic impulse record member having such a magnetic material dispersed in a binding medium is also claimed.

4 Claims, 1 Drawing Figure

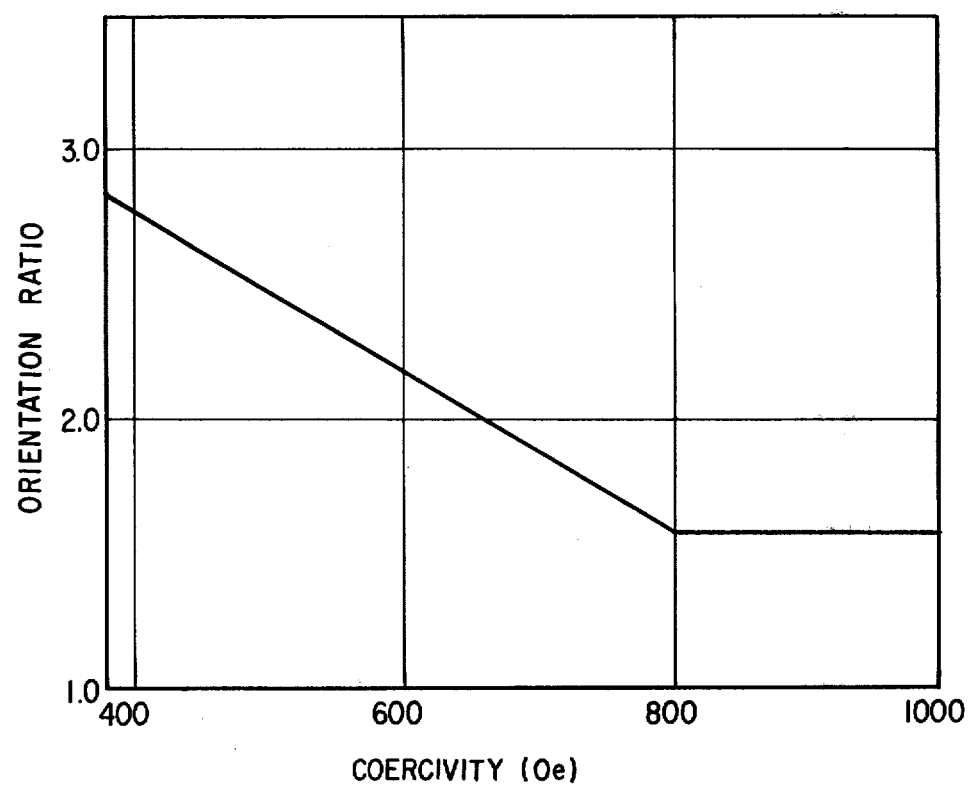

COBALT MODIFIED MAGNETIC IRON OXIDE

CROSS REFERENCE TO RELATED APPLICATIONS

This application is a continuation-in-part of my co-pending application, Ser. No. 954,498 filed Oct. 25, 1978, now abandoned.

BACKGROUND OF THE INVENTION

This invention relates to iron oxide particles useful as magnetic recording materials. In particular the invention relates to iron oxides which are surface modified with cobalt and, at times, with other metal ions such as chromium and ferrous ions.

The literature is replete with materials which are surface modified with cobalt and oftentimes with other metals such as chromium. For example, the following U.S. patents discuss such materials: U.S. Pat. Nos. 4,066,564; 4,066,565; 4,069,164; and 4,071,654. There are also references to such magnetic materials in foreign patent applications. For exaple, Japanese applications Nos. 51-38094, 51-38095, 51-38096, 52-24237, 49475/74, 44040/73 and 87397/73 all make reference to such materials.

While the above named patents and applications represent a continuum in the advance of the art of magnetic materials which are surface modified, it is the present invention which provides a cobalt modified magnetic iron oxide for magnetic recording which has a minimal degradation of orientation ratio even at relatively high cobalt levels. Such degradation usually occurs when one increases the cobalt level in order to increase the coercivity (Hc). A further object of the present invention is to provide a cobalt modified magnetic iron oxide with yet another superior characteristic which we have termed M-factor. This characteristic is related to magnetostriction and it will be fully defined further in this application.

SUMMARY OF THE INVENTION

The present invention comprises a magnetic material of magnetic iron oxide modified with at least about 0.5 weight % cobalt based on the weight of total product which when combined with a binder at a 75% by weight loading forms a magnetic recording member having an orientation ratio and coercivity value that corresponds to a coordinate vlaue equal to or above the coordinate values on the FIGURE and an M-factor value between about $-1.0$ and $+1.0$. In general, a range of from about 0.5 to 10 weight % cobalt based on the weight of the total product is useful. The preferred magnetic material of this invention is that in which the amount of cobalt present is from about 0.5 to about 5.0 weight % based on the total product weight. The magnetic material of this invention in which chromium is also present in an amount of from about 0.1 to about 0.3 weight % based on the weight of the total product is also preferred. A magnetic impulse record member comprising a suitable binding medium having dispersed therein the magnetic material of this invention is also claimed in this application.

The magnetic material of this invention will find utility in the fields of magnetic copying, for example high speed printing, data storage (discs and tapes) and magnetic recording in the forms of audio and video tapes.

DETAILED DESCRIPTION OF THE DRAWING

The FIGURE shows a plot of orientation ratio as a function of coercivity measured parallel to the aligned direction.

DETAILED DESCRIPTION OF THE INVENTION

The modification of a magnetic iron oxide with cobalt in order to increase the coercivity (Hc) is well known in the art. However, the presence of cobalt can produce the undesirable result of degrading the orientation ratio. The presence of cobalt increases the magnetocrystalline anisotropy and therefore gives multiple magnetic easy axes within each particle rather than the desirable single easy axis which exists in an unmodified acicular magnetic iron oxide particle. When the cobalt modified magnetic iron oxide is combined with a binder, coated on a substrate and oriented to form a magnetic impulse record member, the multiple easy axes of the particles are responsible for the degradation of the orientation ratio. This degradation results in undesirable recording performance; for example, the recording sensivity will be lowered, the maximum signal at short wavelengths will be decreased, and the print through will be degraded. The orientation ratio (Br $\|$/Br $\perp$) is defined as the ratio of saturation remanent flux density of a magnetic impulse record member in the direction parallel to particle orientation to the saturation remanent flux density in a direction perpendicular thereto.

The present invention represents an advance in the state of the art in that the orientation ratio of the tapes prepared from the surface modified iron oxide particles of this invention is degraded only slightly and therefore the recording performance is superior when compared to that of known cobalt modified magnetic recording materials.

The superiority of the oxide of the present invention is evidenced by two primary factors; namely, the measurement shown in the FIGURE and the M-factor. The oxides of this invention have values equal to or higher than the coordinate values on the curve of the FIGURE while particles incorporated in tapes whose measurements fall below this curve will not have the desirable magnetic characteristics of this invention. Generally speaking, the highest possible orientation ratio is desired. Theoretically there is no upper limit to orientation ratio but today's tape technology has yielded orientation ratios of only up to about 3.5. This figure forms the practical upper limit of the present invention. On the FIGURE, it is seen that a coercivity of 380 corresponds to an orientation ratio of 2.85 and that the relationship between these two values is linear to a coercivity of 800 and an orientation ratio of 1.6.

The M-factor is defined as the ratio of the coercivity change of a test tape to the coercivity change of a gamma iron oxide reference tape when the same tension is applied to the two tapes. M-factors between about $-1.0$ and $+1.0$ are found to be desirable.

This M-factor is one aspect of the well-known phenomenon of magnetostriction. In this patent application the term magnetostriction describes the change in magnetic properties produced by mechanical or magnetic forces acting on magnetic particles. This phenomenon is also observed when the particles are in magnetic tapes. This observation is of importance because during the recording and playback processes a magnetic tape is subjected to flexion and tension as it passes over the heads, small radius guides, pinch-rollers and capstans. Due to the presence of such mechanical forces the magnetic properties of the particles and hence of the tape are altered; i.e., the coercivity is lowered. Normally, the demagnetizing field existing in a magnetic tape is prevented from self-erasing the recorded signal by the high coercivity (Hc) of the tape. Therefore, if the Hc of a tape decreases as a result of its magnetostrictive characteristics (M-factor) some of the recorded signal, especially at short wavelengths and high record levels, will be lost. Generally, if the M-factor is relatively close to zero the playback of the recorded signal at short wavelengths is unaffected by magnetostriction. Recent manufacturing standards demand that only a small degradation of recorded signal can be permitted even after several hundred passes on a record-playback machine. For a discussion of magnetostriction, see Philip J. Flanders, *Institute of Electrical and Electronics Engineers*, Vol. Mag-10, No. 4, December, 1974 page 1050–1052 and Vol. Mag-12, No. 4, July, 1976, page 348–355.

The novel cobalt surface modified magnetic iron oxides of this invention not only provide superior orientation ratios for a given Hc but also have outstanding magnetostrictive characteristics (M-factor). Due to the superior orientation ratio both long and short wavelength sensitivity is superior. Other magnetic characteristics which have been noted to be exceptional in tapes made with the material of this invention are print-through, squareness and switching field distribution. Furthermore, the magnetic aging or change in Hc as a function of time at ambient conditions is minimal due to the low FeO level. Also, because the product of this invention contains only about 1% to 4 weight % FeO and does not tend to oxidize further at ambient conditions, the chemical stability is considerably improved over magnetic materials having a higher FeO content as well as over cobalt modified magnetite itself. The amount of FeO that results in the preferred M-factor is from about 1 to 4% by weight depending somewhat on the cobalt content.

It will be apparent from the foregoing discussion that in order to recognize the superiority of the magnetic material it will usually be necessary to incorporate these particles with a binder into an aligned magnetic tape. Generally speaking, powder characteristics, those measurements made directly on the magnetic material, are not sufficient indicators of superior tape characteristics. It is only when a tape is prepared and measurements are made that one can be sure that the magnetic material is truly superior.

The novel magnetic materials of this invention are prepared by simply coating a suitable magnetite starting material with cobalt ions and possibly also with chromium and ferrous ions and thermally processing the coated particles. The cobalt coating of the magnetite is easily accomplished by slurrying the magnetite in water and adding an appropriate quantity of cobalt ions and optionally iron ions with stirring. The presence of the iron ions in the coating appears to be advantageous in that the addition of a small amount, up to about 1% by weight of ferrous ions, appears to enhance the Hc produced by the presence of a given amount of cobalt.

If a chromium coating is desired, a chromium salt is merely added to the slurried magnetite and the adsorption of the chromium ion onto the magnetite is effected by heating. The chromium may also be precipitated by adjusting the pH to about 6 with or without the addition of heat. Afterwards, the cobalt and optionally the iron ions are added and the pH of the slurry is adjusted to about 10 in order to precipitate the cobalt or cobalt and iron ions onto the magnetite particles.

At this point, the slurry may be aerated or the aeration may be omitted. The product is then filtered, washed and preferably dried in air at atmospheric pressure. The surface coated particles are then heated in a closed kiln and oxidized to the desired FeO level. Optionally, the product may be annealed prior to the oxidation step. The annealing is desirable if one wishes to diffuse more cobalt into the particle than would be diffused during the oxidation step alone. The advantage which results from this diffusion is that the coercivity can be adjusted to a desired level independent of small variations in starting materials and in the coating step. The oxidation step is usually performed at temperatures of from about 140° to 220° C. in air.

The additional coating of chromium ions on the particle represents one preferred embodiment of this invention. While the exact mechanism is not known, it is believed that the chromium on the surface of the magnetite hinders the cobalt from diffusing rapidly into the particle. Although a slow diffusion is not necessary to achieve the final desired product of this invention, it is useful in that during the thermal processing of the cobalt modified magnetite the magnetic properties are more easily controlled. The addition of chromium also appears to enhance the chemical stability of the final product. Although chromium is the preferred ion useful as the control agent, it is expected that silica and metal ions such as aluminum, zinc and possibly others would serve the same purpose.

Magnetites suitable for use as starting materials are those which orient well in a magnetic record member, for instance those prepared from highly acicular alpha- or gamma-FeOOH by dehydration and reduction at temperatures of from about 225° to 550° C. The reducing atmosphere may be chosen from hydrogen, carbon monoxide and the like. From a safety standpoint as well as convenience it is often desirable to carry out the reduction in the presence of reducing gases created by the thermal decomposition of hydrophobic aliphatic monocarboxylic acids. Such reduction conditions are well-known in the art.

As a cobalt source, water-soluble cobalt salts may be used, for example, cobaltous chloride, cobaltous sulfate or cobaltous nitrate. The iron salt used as a source of the iron ion may be chosen from ferrous sulfate, ferrous chloride, ferrous nitrate or other water-soluble ferrous salts. If a chromium coating is desired, this source will also be a water-soluble salt such as chromium sulfate, chromium chloride or chromium nitrate.

In a typical embodiment of this invention an acicular magnetite starting material is prepared from gamma-FeOOH by dehydration and subsequent reduction at temperatures of between about 226° and 538° C. The gamma-FeOOH is prepared by the precipitation of an iron salt, preferably ferrous chloride, with alkali. The concentration of the aqueous iron salt solution is between about 30 and 85 grams of ferrous chloride per liter. The alkali is selected from NaOH, KOH, Ca(OH)$_2$, NH$_4$OH or NH$_3$. A seed is prepared by precipitating about one-half to two-thirds of the ferrous ion. Then the particles are grown to the desired size by adding further amounts of alkali to precipitate the remaining ferrous ion during the seed growth or generation stage. The temperature during the seed forming step should not exceed about 30° C. and during the generation stage it should be kept below about 60° C. The pH should be maintained below about 4.0 during both stages. Mechanical agitation and aeration of the slurry is required during both the seed formation and the generation stages. The generation stage preferably is from about two to ten hours in duration.

The magnetic material of this invention is preferably prepared by deagglomerating such acicular magnetite and by dispersing it in water with vigorous agitation. A chromium salt, preferably chromium sulfate, is added at about 0.17% chromium by weight based on the weight of the magnetite and the slurry is heated to from about 50° to 70° C. The slurry pH is then adjusted to about 5.0 with aqueous NaOH if necessary. After the chromium is adsorbed, a mixed solution of cobalt sulfate and ferrous sulfate corresponding to 3.3% cobalt and 0.9% Fe++ (weight percent based on the weight of the magnetite) is added to the reactor. The pH of the slurry is then slowly raised to about 10 with a dilute NaOH solution and the temperature is raised to about 65° to 90° C. and maintained for up to about one hour. The material is filtered, washed and dried at a temperature below 85° C. The dried product is then annealed in an inert atmosphere at a temperature of between about 150° and 300° C. after which it is oxidized with an oxygen containing gas, preferably air, at temperatures between 150° and 210° C. to an FeO content of between about 1.0 and 4.0%. The product is then mechanically densified, for example, using a ball mill, roller mill, or muller-mixer in order to reduce the degree of agglomeration of the particles.

The completed magnetic material of this invention is then ready to be incorporated into a magnetic record member. Any suitable binding medium may be used, for example, those discussed in U.S. Pat. No. 2,711,901 and U.S. Pat. No. 4,018,882.

For the purpose of evaluation, magnetic tapes containing the magnetic material of this invention are prepared from a laboratory vinyl copolymer formula such as the one shown in Table 1 below using 75% by weight loading of magnetic material.

TABLE 1

| The ingredients set out in the table below in parts by weight are mixed and introduced into a ball mill. | |
|---|---|
| Cobalt Modified Magnetic Iron Oxide | 840 |
| Methyl Abietate-maleic Glycol Ester | 60 |
| Vinyl Resin (13% vinyl acetate 87% vinyl chloride copolymer) | 120 |
| A plastisizer (a linear high molecular weight polyester resin prepared by the reaction of a dibasic acid with a dihydric aliphatic alcohol) | 60 |
| Methyl isobutyl ketone | 500 |
| Toluol | 500 |
| Sodium dioctylsulfosuccinate | 33.5 |

This mixture is ball milled for forty-eight hours to yield a product having a viscosity of approximately 95 Krebs units. The formulation is then applied in accordance with known practice to a polyethylene terephthalate base in the form of a three inch strip. While the applied coating is still wet, it is run through a magnetic field to orient the particles, in a known manner, after which the strip is dried and may be calendered, compressed or burnished. Finally it is slit and put on rolls or reels under tension. The normal coating thickness is from about 0.10 to 0.60 mil, and in the specific examples presented in this application it was about 0.40 mil.

The orientation ratio and coercivity are measured on a ¼ inch disc cut from tapes containing the cobalt modified magnetic iron oxide as prepared above. Such a disc, is placed in a vibrating sample magnetometer (VSM) so that the applied magnetic field is parallel to the direction of alignment of the particles in the tape and it is magnetically saturated at 9 kOe. Then the applied field is reduced to zero and the parallel saturation remanent flux density (Br ∥) value is obtained. Next, the disc is rotated so that its particles are perpendicular to the applied field and again it is saturated at 9 kOe. Now the perpendicular saturation remanent flux density in the plane of the disc (Br ⊥) can be measured after the field has been reduced to zero. The orientation ratio is derived by dividing Br ∥ by Br ⊥.

To measure coercivity the disc is saturated at 9 kOe in the parallel direction. The coercivity is the value of the applied magnetic field at which the remanence is zero.

The M-factor, is measured on magnetic tapes using a precise B-H meter. This meter should be capable of distinguishing differences of 1 Oe or less in Hc. The maximum applied field should exceed the coercivity by a factor of at least two to three. The change in Hc with tension of a tape is measured by (1) Applying a given tension to the tape and measuring the Hc 10 seconds later;

(2) immediately releasing the tension and again measuring the Hc 10 seconds later;

(3) repeating steps 1 and 2 to insure precision.

The change in Hc (ΔHc) is the average Hc found in step 1 minus the average Hc in step 2. Of course, the given tension should be high enough that a significant change in Hc occurs at least for the reference tape but low enough that no noticeable deformation occurs in the tape.

The change in Hc with tension is measured on both a gamma iron oxide reference tape and a test tape under the following conditions:

(1) The nonmagnetic backing material and its thickness, the coating thickness and the coating formulation must be the same on both the reference and test tapes;

(2) the same tension must be applied to both tapes;

(3) all measurements must be done at the same temperature, preferably 15°–30° C.

The M-factor is the ratio of the ΔHc in the test tape divided by the ΔHc of the reference tape.

FeO content is measured by using the well known ceric titration employing ceric sulfate as the oxidizing agent. Chromium and cobalt content are measured by atomic absorption wherein the equipment used has a precision or standard of error of + or − 5% of the amount determined; i.e., in Example 1 the cobalt amount and precision are 3.5 + or − 0.175.

The examples to follow are merely illustrative and in no way limit the scope of the appended claims.

EXAMPLE 1

Three hundred and sixty kilograms of deagglomerated magnetite prepared as described hereinabove was dispersed in 1210 liters of water at ambient temperature using vigorous agitation. The slurry was diluted to 4160 liters with water and 4.1 kilograms of $CrSO_4.7H_2O$ (0.17 weight percent based on the magnetite) was added. The temperature was raised to 66° C., and the slurry stirred for one hour. A 760 liter solution containing 19.1 kilograms of FeSO$_4$.7H$_2$O and 62.2 kilograms of CoSO$_4$.7H$_2$O and corresponding to 1.0 wt. % Fe ions and 3.64 wt. % Co based on the magnetite was added. The pH was then raised to 9.2 with a dilute NaOH (6% NaOH) solution and the slurry stirred for one hour while maintaining the temperature at 67° C. The solids were then separated by filtration, washed, and dried at 82° C. Four hundred fifty-four grams of the thus prepared coated magnetite was placed in a rotating kiln and heated to 236° C. The temperature was lowered to 150° C. and air was introduced into the kiln at 1.5 liter per minute. The temperature during the oxidation was allowed to reach 195° C. and the time of oxidation was 4¾ hours. After cooling, the material was then mechanically densified for two hours in a muller-mixture machine. The final product has a FeO content of 2.9 weight percent, cobalt content of 3.5 weight percent and a chromium content of 0.18 weight percent.

EXAMPLE 2

A 57-liter portion of the slurry of Example 1 taken just prior to filtration was aerated with 4 liters of air per minute for 4 hours. This sample was then filtered, washed, and dried at 82° C. Four hundred and fifty-four grams of the above coated magnetite were placed in a rotating kiln and heated to 228° C. The temperature was lowered to 150° C. and air was introduced at a rate of 1.5 liters per minute. The maximum temperature attained during the oxidation was 180° C. and the time of oxidation was 3⅝ hours. The material was then mechanically densified for 2 hours in a muller-mixer machine. The FeO content of the resulting final product was 2.6 weight percent, the cobalt content was 3.4 weight percent and the chromium content was 0.17 weight percent.

EXAMPLE 3

Acicular magnetite, 2.8 kilograms, prepared as described hereinbefore was dispersed in 37.0 liters of water. The slurry was heated to 67° C. and while stirring, a mixed solution of cobalt sulfate and iron sulfate corresponding to 3.3 weight percent cobalt and 1.0 weight percent iron ions (based on the magnetite) was added. The pH of the slurry was raised to 10.0 with a dilute NaOH (6% NaOH) solution. The temperature was raised to 90° C. and after stirring 1 hour the slurry was aerated for 2 hours using 240 liters of air per hour while maintaining the temperature. The solids were separated by filtration and after being washed with water, the material was dried at 82° C. Four hundred fifty-four grams of the coated magnetite was placed in a rotating kiln and was heated to 206° C. under a flow of nitrogen. The temperature was then decreased to 157° C. and air was introduced into the kiln at a rate of 0.75 liters per minute. The temperature during oxidation reached a maximum of 173° C. and the time of oxidation was 153 minutes. The material was mechanically densified for 2 hours in a muller-mixer machine. The FeO content of the resulting product was 1.1 weight percent and the cobalt content was 3.0 weight percent and the chromium content was 0.002 weight percent (impurities).

EXAMPLE 4

Acicular magnetite, 2.8 kilograms, prepared as hereinbefore described, was dispersed in 37.0 liters of water using vigorous agitation. A chromium sulfate solution corresponding to 0.3 weight percent Cr (based on the weight of the magnetite) was added after which the slurry was heated to 50° C. The pH of the slurry was then raised to 5.0 by the addition of a dilute (6%) NaOH solution and then the slurry was stirred for half an hour. A mixed solution of cobalt sulfate and iron sulfate containing 0.5 weight percent cobalt and 0.94 weight percent iron (based on the weight of the magnetite) was added. The pH of the slurry was then raised to 10.0 with an aqeous NaOH (6%) solution. The slurry was heated to 70° C. and after half an hour the slurry was aerated for 2 hours while maintaining the temperature. The amount of air used was 11.5 liters. The solids were separated by filtration and after being washed, the coated particles were dried at 82° C. Four hundred fifty-four grams of the thus prepared cobalt modified material was placed in a rotating kiln and heated to 225° C. under nitrogen. The temperature was decreased to 169° C. and air was introduced into the kiln at a rate of 2.2 liters per minute. The oxidation time was 137 minutes and the maximum temperature achieved was 181° C. After cooling, the product was mechanically densified for 2 hours in a muller-mixer machine. The FeO content of the final product was 1.9 weight percent, the cobalt content was 0.49 weight percent and the chromium content was 0.23 weight percent.

EXAMPLE 5

Acicular magnetite, 2.8 kilograms, prepared as described hereinabove was slurried in 37.0 liters of water. A chromium sulfate solution containing 0.1 weight percent Cr (based on the weight of the magnetite) was added, after which the slurry was heated to 50° C. The pH of the slurry was raised to 5.0 with a dilute NaOH solution (6% NaOH) and the slurry was stirred for half an hour. After adding a mixed solution of cobalt sulfate and iron sulfate which corresponds to 5 weight percent Co and 0.94 weight percent Fe (based on the weight of the magnetite) the slurry pH was adjusted to 10.0 with an aqueous 6% NaOH solution. The slurry was stirred for one hour and then heated to 90° C. after which 4 liters per minute of air was introduced into the reactor for 1 hour. The slurry was then filtered, the solids were washed with water and dried at 82° C. Four hundred fifty-four grams of the thus prepared coated material was placed in a rotating kiln and heated to 281° C. under nitrogen. The temperature was reduced to 169° C. and air was introduced into the kiln at a rate of 0.75 liters per minute. The oxidation time was 133 minutes and the maximum temperature attained was 173° C. The product was then densified in a muller-mixer machine for 2 hours. The final FeO content of the cobalt modified magnetic material was 1.3 weight percent, the chromium content was 0.09 weight percent and the cobalt was 5.1 weight percent.

EXAMPLE 6

Acicular magnetite, 2.8 kilograms, prepared as described hereinabove, was dispersed in 37.0 liters of water with stirring. While continuing the stirring, a chromium sulfate solution corresponding to 0.17 weight percent Cr (based on the weight of the magnetite) was added. The slurry was then heated to 67° C. and stirred for one hour. Then a cobalt sulfate solution containing 3.3 weight percent Co (based on the weight of the magnetite) was added and the pH of the slurry was raised to 8.8 with a dilute NaOH (6%) solution. The slurry was then heated to 89° C. and after 1 hour, 4 liters per minute of air was introduced into the reactor for 1 hour. The slurry was filtered and the solids were washed and dried at 82° C. Five hundred grams of the coated nagnetite was heated in a rotating kiln to 233° C. under nitrogen. The temperature was decreased to 169° C. and air was introduced into the kiln at a rate of 0.75 liters per minute. The temperature was allowed to reach 181° C. during the oxidation which lasted 109 minutes. The material was then densified for 2 hours in a muller-mixer. The FeO content of the final product was 1.0 weight percent, the cobalt content was 3.0 weight percent and the chromium content was 0.14 weight percent.

EXAMPLE 7

Acicular magnetite, 2.7 kilograms, prepared as described hereinabove, was dispersed in 36.8 liters of water with vigorous agitation. The slurry was then heated to 67° C. and while stirring, a cobalt sulfate solution corresponding to 2.75 weight percent cobalt (based on the weight of the magnetite) was added. The pH of the slurry was then raised to 10.0 with an aqueous 6% NaOH solution. The temperature of the slurry was then raised to 90° C. and after one hour the slurry was aerated for 2 hours using 240 liters of air per hour. The solids were then separated by filtration, and after being washed, were dried at 82° C. Four hundred and fifty four grams of the thus prepared cobalt modified materials was placed in rotating kiln and heated to 210° C. under nitroggen. The temperature was decreased to 185° C. and air was introduced into the kiln at a rate of 1 liter per minute. The oxidation time was 45 minutes and the maximum temperature achieved was 185° C. After cooling, the product was mechanically densified for 2 hours in a muller-mixer machine. The FeO content of the final product was 1.8 weight percent and the cobalt content was 2.2 weight percent.

EXAMPLE 8

The cobalt modified iron oxide products of Examples 1 through 7 were incorporated into magnetic tapes in the manner described hereinbefore. The Hc, orientation ratio and M-factor were measured on each tape as previously described. The results are tabulated in Table 2.

TABLE 2

| Magnetic Tapes Prepared From Examples No. | Tape Coercivity (Oe) | Orientation Ratio | M-Factor |
| --- | --- | --- | --- |
| 1 | 626 | 2.20 | +0.9 |
| 2 | 594 | 2.38 | +0.6 |
| 3 | 554 | 2.85 | −0.4 |
| 4 | 390 | 3.04 | −0.1 |
| 5 | 880 | 1.80 | +0.9 |
| 6 | 560 | 3.23 | +0.7 |
| 7 | 540 | 2.46 | −0.3 |

I claim:
1. Magnetic particles comprising magnetic iron oxide having an FeO content of from about 1 to 4 weight % and modified with at least about 0.5 weight % cobalt, both percentages being based on the weight of total product;
   said particles, in a magnetic recording member at a loading of 75 weight %, providing an orientation ratio and coercivity equal to or above coordinate values on the two line segments in the FIGURE herein which meet at a coercivity of 800 and an orientation ratio of 1.6;
   said recording member being formed by incorporating said particles into the formulation of Table 1 herein, coating said formulation onto polyethylene terephthalate, magnetically orienting said particles therein and thereafter drying said formulation;
   said orientation ratio being determined by placing a quarter-inch disc cut from said member in a vibrating sample magnetometer with the applied magnetic field parallel to the alignment of said particles, magnetically saturating said disc at 9 kOe, and reducing said field to zero to obtain parallel saturation remanent flux density (Br $\|$) rotating said disc so that said applied field is perpendicular to said particles and repeating said magnetic saturation and field reduction steps, to obtain perpendicular saturation remanent flux density (Br $\perp$); and dividing Br $\|$ by Br $\perp$;
   and said coercivity being determined by magnetically saturating said disc at 9 kOe with said applied magnetic field parallel to the alignment of said particles and measuring the value of said field at which the remanence is zero.
2. The magnetic particles of claim 1 in which the amount of cobalt present is from about 0.5 to about 5 weight percent based on the weight of total product.
3. The magnetic particles of claim 1 in which chromium is present in an amount of from about 0.1 to about 0.3 weight percent based on the weight of total product.
4. A magnetic impulse record member comprising the particles of claim 1 dispersed in a binding medium.

* * * * *